United States Patent [19]
Bell, III

[11] 3,982,390
[45] Sept. 28, 1976

[54] GAS TURBINE ENGINE COOLING SYSTEM
[75] Inventor: Albert H. Bell, III, Birmingham, Mich.
[73] Assignee: General Motors Corporation, Detroit, Mich.
[22] Filed: Jan. 7, 1976
[21] Appl. No.: 647,449

Related U.S. Application Data
[63] Continuation of Ser. No. 499,480, Aug. 22, 1974, abandoned.

[52] U.S. Cl............................. 60/39.16 R; 60/39.66
[51] Int. Cl.²........................ F02C 7/02; F02C 7/12
[58] Field of Search............... 60/39.16 R, 39.16 S, 60/39.16 C, 39.33, 39.66; 188/270, 290, 296; 415/163, 164

[56] References Cited
UNITED STATES PATENTS
3,551,068 12/1970 Scalzo.............................. 415/116
3,678,285 7/1972 Griffith ........................ 60/39.16 R
3,742,705 7/1973 Sifford .............................. 415/116

Primary Examiner—Carlton R. Croyle
Assistant Examiner—L. J. Caseragola
Attorney, Agent, or Firm—John C. Evans

[57] ABSTRACT

A device to produce engine braking on a two-shaft gas turbine engine including an air brake compressor on the power turbine shaft for absorbing energy from the power turbine shaft thereby to control power transfer to a power output shaft. The system includes a variable control assembly to throttle inlet air flow to the air brake compressor so as to regulate the amount of power absorption from the power turbine shaft.

1 Claim, 5 Drawing Figures

GAS TURBINE ENGINE COOLING SYSTEM

This is a continuation of application Ser. No. 499,480, filed Aug. 22, 1974 now abandoned.

This invention relates to gas turbine engines and more particularly to a two-shaft gas turbine engine having an associated power absorption system for engine braking.

Two-shaft gas turbine engines have been proposed for use on automobile and other vehicles. One problem is that a gas turbine engine of this type will have a substantial inertia and will have reduced internal braking as compared to existing piston engines that are used to power passenger car vehicles.

Accordingly, an object of the present invention is to improve two-shaft type gas turbine engines for use in automotive vehicles by providing means therein to produce internal braking of the output shaft that is comparable to that found in piston-type internal combustion engines.

Another object of the present invention is to improve two-shaft type gas turbine engines by connecting an energy absorbing compressor means to the turbine power shaft which is operative to absorb increased energy when the vehicle is braked and at the same time have characteristics for minimal power absorption under normal driving conditions. Still another object of the present invention is to include a compressor wheel on one end of the power turbine shaft of a two-shaft gas turbine engine that is associated with inlet flow control means to vary the mass flow through the compressor wheel so that the compressor will absorb less energy under normal driving conditions and will absorb increased energy under braking conditions.

Still another object of the present invention is to provide a two-shaft gas turbine engine wherein the power turbine shaft has an air compressor impeller coupled thereto for absorbing energy from the power turbine shaft in accordance with the mass flow of air through the compressor and wherein the air discharged from the power absorbing compressor impeller on the power turbine shaft is directed through passages in the gas turbine for cooling components therein.

Yet another object of the present invention is to provide an improved two-shaft type gas turbine engine by the provision therein of a power absorbing air brake compressor connected directly to a power turbine shaft and operative to absorb a varying amount of power from the power turbine shaft in accordance with the amount of mass flow of air through the air brake compressor to produce a braking action on the output shaft of the turbine and wherein the mass flow is controlled by an improved variable geometry vane controller having a plurality of circumferentially spaced vanes each operated by a control lever and pin coupled to a control ring eccentrically mounted with respect to the drive shaft of the compressor and operated by a rotatable actuating arm to shift each of the pins in a manner to either open or close communication to the inlet of the power absorbing compressor in accordance with the operating speed of the vehicle to produce a greater or lesser degree of power absorption from the power turbine shaft thereby to produce an internal braking effect within the gas turbine engine comparable to that found in piston type internal combustion engines.

Yet another object of the present invention is to provide an improved variable geometry controller for regulating mass flow of air through a rotary compressor machine; the controller including a rotatable actuating arm coupled to an offset control ring having a plurality of circumferentially spaced slots therein each receiving a control pin connected to one end of an operating lever and wherein the control ring is shifted so as to move each of the pins in a path about the centerline of a support ring having a plurality of circumferentially located vane shafts supported thereon each coupled to one of the levers and operated upon movement of the control ring to produce angular movement of the shaft and angular adjustment of a plurality of circumferentially located and spaced control vanes for varying the flow area through a radial path upstream of an axial inlet to the rotary machine.

Further objects and advantages of the present invention will be apparent from the following description, reference being had to the accompanying drawings wherein a preferred embodiment of the present invention is clearly shown.

Figure 1:
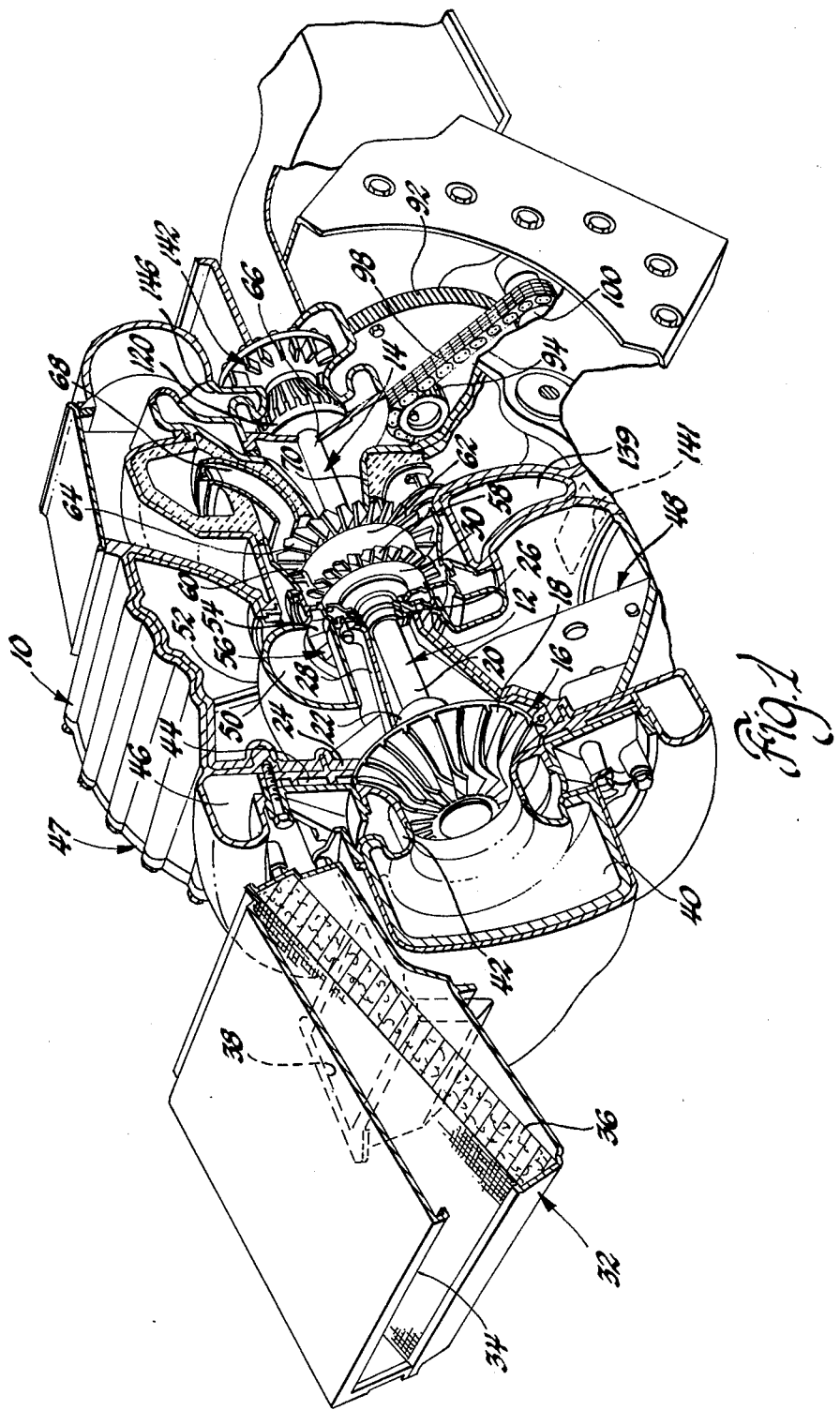
FIG. 1 is a perspective view partially broken away and partially sectioned, of a two-shaft type gas turbine engine.

Referring now to FIG. 1, a gas turbine engine 10 is illustrated having a gasifier section 12 and a power turbine section 14. The gasifier section 12 includes a gas turbine compressor 16 having a centrifugal impeller 18 connected to one end of a first shaft 20 rotatably supported by bearing means 22 at one end thereof from a bulkhead 24 and by bearing means 26 supported on a housing extension 28 in spaced surrounding relationship to the shaft 20. The shaft 20 further includes a gasifier turbine 30 connected to the opposite end thereof outboard of the bearing means 26.

In the illustrated arrangement, inlet air flow to the gas driven engine 10 is through a filter assembly 32 including an inlet opening 34 and a flat bed filter element 36 interposed upstream of a generally rectangularly configured inlet opening 38, thence through a scroll passage 40 to an annular inlet eye 42 leading to the axial inlet end of the centrifugal impeller 18. Compressed air is discharged from the impeller 18 through a radial passage 44 to a scroll 46 that has an outlet (not shown) in communication with a rotating regenerator 47. Heat is transferred in the regenerator 47 to the compressed air from the compressor 16. The heated compressed air is thence directed into a combustor assembly 48 where the compressed air is mixed with fuel and ignited so as to produce combustion products that are directed through a passage 50 in a combustion nozzle box 52 that leads to an annular axial outlet 54 having a plurality of circumferentially spaced nozzle vanes 56 therein.

Combustion products are directed through the nozzle vanes 56 against radially outwardly directed blades 58 at circumferentially located points along the outer circumference of the gasifier turbine 30 to cause energy transfer from the hot combustion gases to rotary movement of the shaft 20 so as to produce compression of air by the gas turbine compressor 16 for use in the combustion process.

The combustion products pass from the blades 58 of the gasifier turbine 30 and are directed through an annular axial passage 60 to a power turbine 62 which has a plurality of circumferentially spaced blades 64 on the outer periphery thereof which are acted upon by the combustion products for driving a power turbine shaft 66 in the power turbine section 14. Exhaust products from the turbine blades 64 are directed through an annular exhaust passageway 68 and are returned through duct means (not shown) to the rotating regenerator section 47 for heating compressed air from the impeller 18 prior to being exhausted to atmosphere.

The aforesaid assembly is typical of two-shaft type gas turbine engines wherein a part of combustion energy is utilized to drive the gas turbine compressor 16 and the remainder is utilized to drive the power turbine shaft 66.

Figure 2:
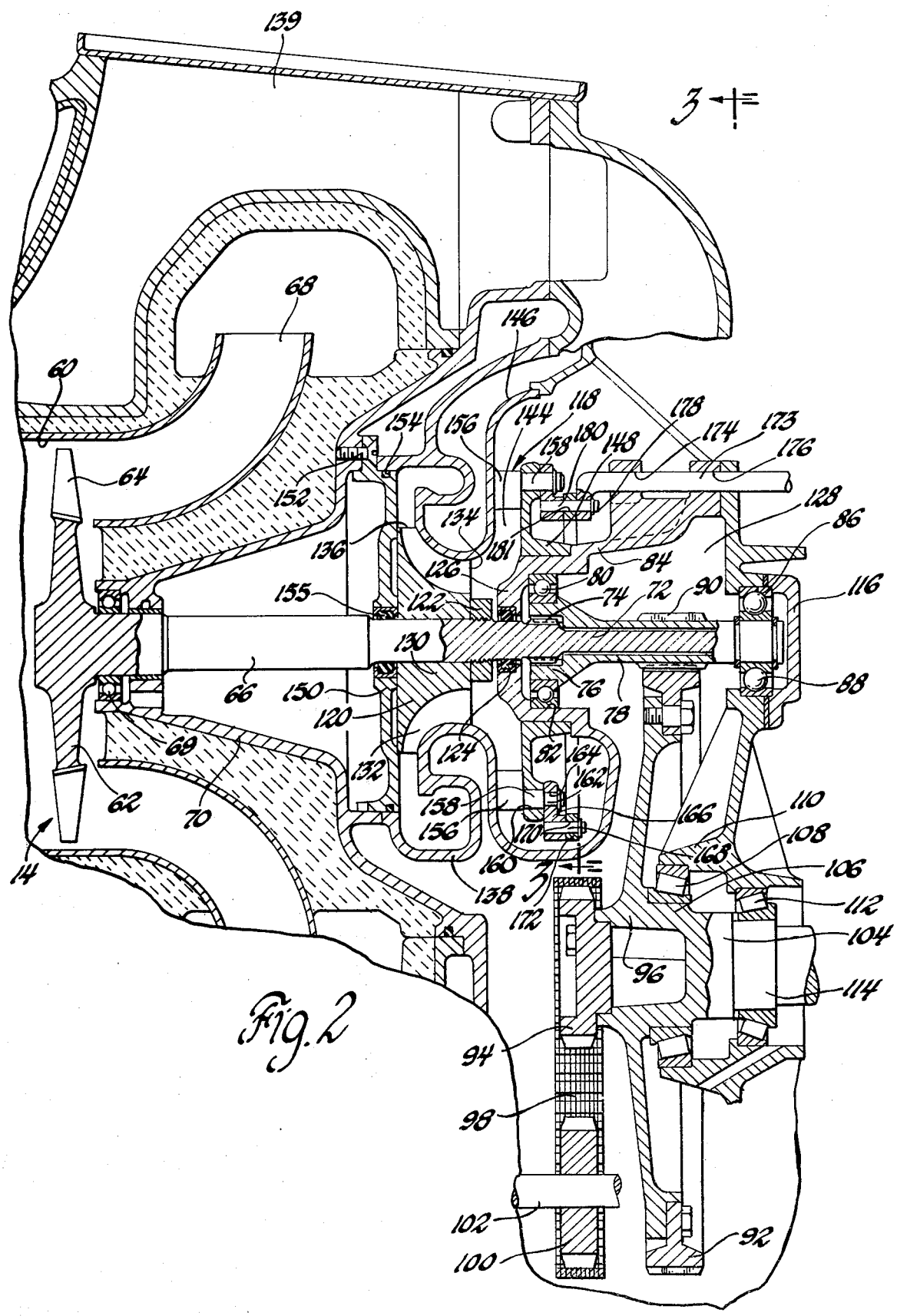
FIG. 2 is an enlarged, fragmentary longitudinal sectional view of the engine in FIG. 1 from the power turbine thereof to the output shaft thereof including a power absorber air brake compresssor with variable inlet control assembly.

As is best seen in FIG. 2, the power turbine section 14 has the shaft 66 thereof supported by a bearing 69 at the inboard end thereof by means of a bulkhead extension 70 and includes a shaft extension 72 thereon having a splined connection 74 to one end 76 of a gear shaft 78. The gear shaft 78 is rotatably supported by a bearing 80 at one end thereof carried within a bore 82 in one end of a bearing housing 84. The bearing housing 84, at the opposite end thereof, has a bore 86 which supports a bearing 88 that supports the opposite end of the gear shaft 78. A pinion 90 on the gear shaft 78 engages a spur gear 92 that includes a first spur gear 94 in gear hub 96. A chain 98 is directed across gear 94 to operate a spur gear 100 connected to an auxiliary power output shaft 102.

The gear 92 includes an output drive shaft 104 having a first diameter portion 106 thereon suppoted by a tapered roller bearing 108 on a dependent annular segment 110 of the bearing housing 84 and a second inclined tapered roller bearing 112 that supports a smaller diameter portion 114 of the stub shaft 104. An end plate 116 is shown as sealed to housing 84 at bearing 86.

In two-shaft type gas turbine engines, power turbine speeds under vehicle deceleration or braking conditions may exceed a power output energy level required for such conditions. The turbine engine 10 has a built-in air brake assembly 118 that produces internal braking comparable to that found in a piston engine. More particularly, the brake assembly 118 includes a compressor wheel 120 mounted on the power turbine shaft 66 forwardly of the pinion gear 74. In the illustrated embodiment, the compressor wheel 120 is in the form of a centrifugal impeller. Its centrifugal head aids through flow pumping during brake operation and produces high specific work. The present invention, however, is not limited to the illustrated centrifugal type impeller but equally applies to axial type impellers capable of absorbing energy from the power turbine shaft 66 during braking modes of operation.

Typical proposed design requirements are that at a mechanical speed of 32,000 RPM corresponding to 70 MPH vehicle speed, the air brake assembly 118 should be capable of absorbing 36 horsepower under brake mode. At the same mechanical speed, under driving conditions, the parasitic power loss of the air brake should be in the range of 1/10th of the brake power absorption during a brake mode.

The compressor wheel 120 is secured on the shaft 66 by a retainer element 122. A seal element 124 on a flanged end 126 of the bearing housing 84 seals the shaft 66 with respect to a gear case cavity 128.

The compressor wheel 120 has a hub 130 with a plurality of blades 132 thereon. Each blade 132 has an axial inlet end 134 and a radial outlet end 136. The discharge from wheel 120 communicates with a scroll 138 to supply cooling air into a cooling chamber 139 which is arranged circumferentially around the power turbine 62 and the exhaust passages therefrom for cooling the engine during operation thereof. Cooling air from chamber 139 is exhausted to atmosphere through opening 141, as best seen in FIG. 1.

Figure 3:
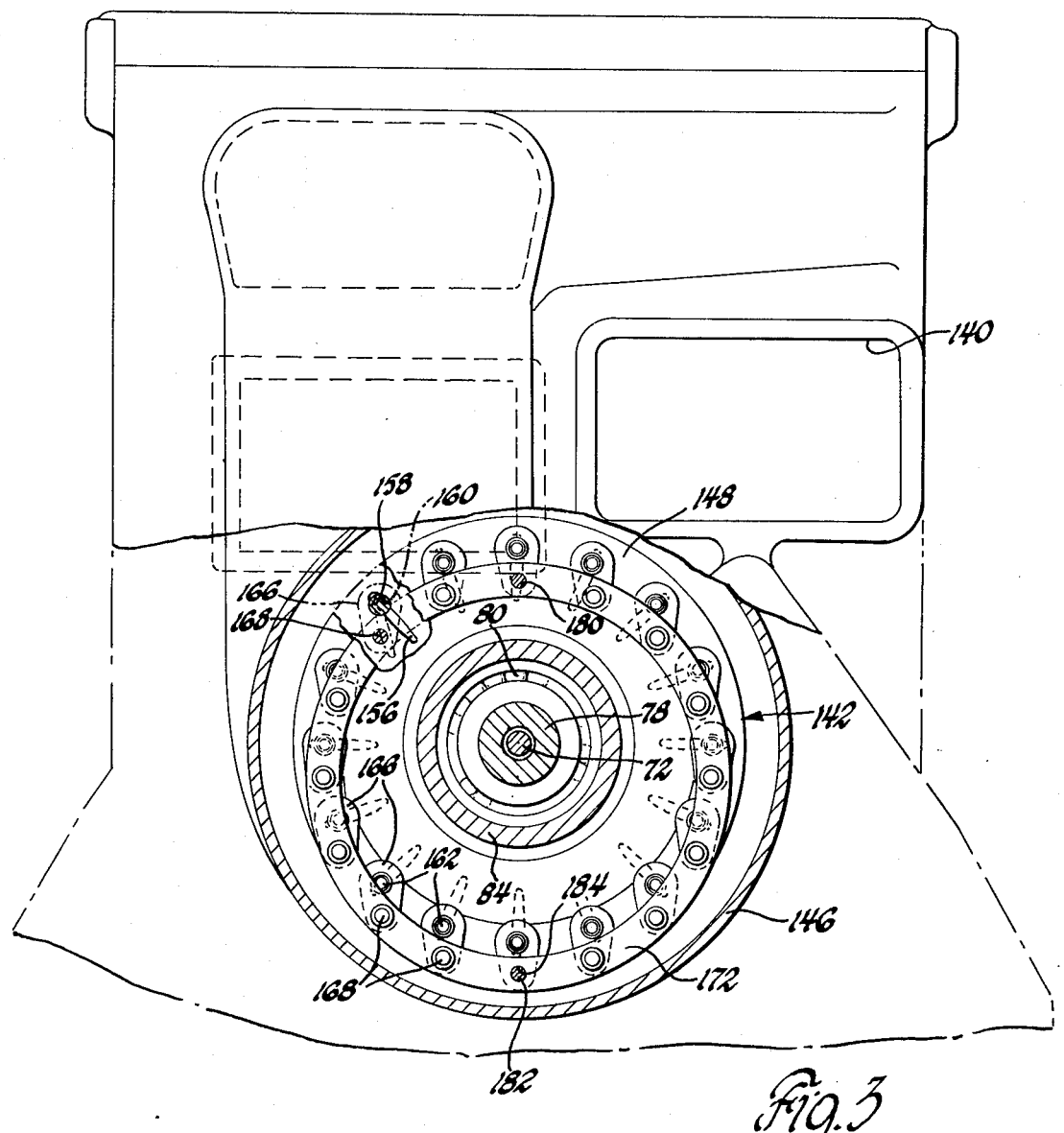
FIG. 3 is a vertical sectional view taken along the line 3—3 of FIG. 2.

An inlet to the compressor 120 is defined by a generally rectangularly configured opening 140 on the end of the turbine engine 10, as shown in FIG. 3. It directs air across a variable geometry inlet controller 142 radially inwardly through an annular passage 144 formed by a compressor housing 146 and a controller support ring 148. The backside of the scroll 138 that forms the discharge passage from the compressor wheel 120 is closed by a plate 150 secured by means of screws 152 at circumferentially spaced points along the outer periphery thereof to the bearing housing 70. The plate 150 includes an annular seal 154 therein which seals the backside of the compressor cavity for the compressor wheel 120. A shaft seal 155 is supported by plate 150 to seal the inboard side of shaft 66.

Since the compressor wheel 120 is mounted directly on the power turbine shaft 66, it absorbs energy therefrom during the braking mode of operation to produce a controlled braking of the output shaft 104 of the gas turbine engine 10.

The degree of control is established by the variable geometry of the controller 142. It more specifically includes a plurality of control vanes 156 located within the radial inlet passageway 144. Each of the vanes 156 has a shaft 158 thereon directed through a bore 160 in the outer periphery of the support ring 148. Each of the shafts 158 further includes a smaller diameter extension 162 thereon directed through a bore 164 in one end of a control lever 166 that has a pin 168 pivotally supported on the opposite end thereof. Each pin 168 is directed through a slightly elongated slot 170 in a control ring 172 that is eccentrically supported with respect to the centerline of the drive shaft 66 as best seen in FIG. 3. The control ring 172 is connected to a crank arm 173 that is directed through spaced apart bores 175, 176 in the upper side of the bearing housing 84. The operating crank 173 is secured by means of a retainer 178 on one end of an elongated pin 180 that is directed through a circular pilot bore 181 in ring 172.

In addition to being piloted at the crank arm 173, the control ring 172 is also piloted at a lower pin 182 located diametrically of pin 180. Pin 182 is directed through a circular bore 184 in the ring 172 so that rotation of the crank arm 173 will produce a piloted shifting movement of the ring 172 about its centerline. This will cause each of the pins 168 that are directed through the elongated slots 170 in the ring 172 to be carried through a path on the outer circumference of the ring 172 to produce a resultant rotation of each of the vanes 156 so as to produce a greater or lesser radial communication from exteriorly of each of the vanes 156 radially inwardly through the passageway 144.

Figure 4:
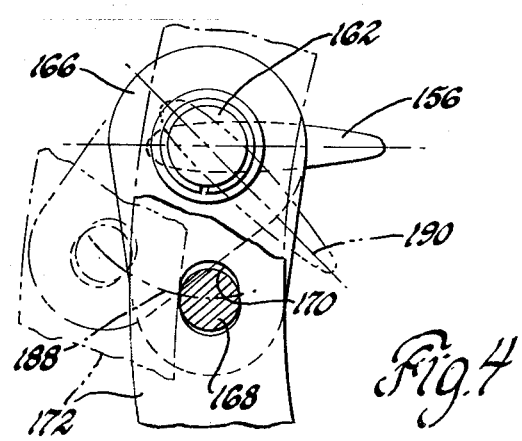
FIG. 4 is an enlarged fragmentary view of one vane of the variable control assembly in FIGS. 2 and 3 in first and second control positions.

As best seen in FIGS. 3 and 4, when the ring 172 is acted upon by the crank 173, it will shift the pins 180, 182 in an arcuate path on either side of the centered position shown in FIG. 3. When the control ring 172 is centered as shown in FIG. 3, each of the vanes 156 will be directed radially inwardly through the centerline of the shaft 66 which is the center of the axial inlet to the compressor impeller 120. Under these circumstances, there is relatively unrestricted flow of air into the compressor and it will therefore induce a substantial mass flow of air therethrough for discharge into the cooling chamber 138 and at the same time will absorb a very great deal of power for a given power turbine speed. This power absorption represents controlled engine braking during turbine engine operation.

Figure 5:
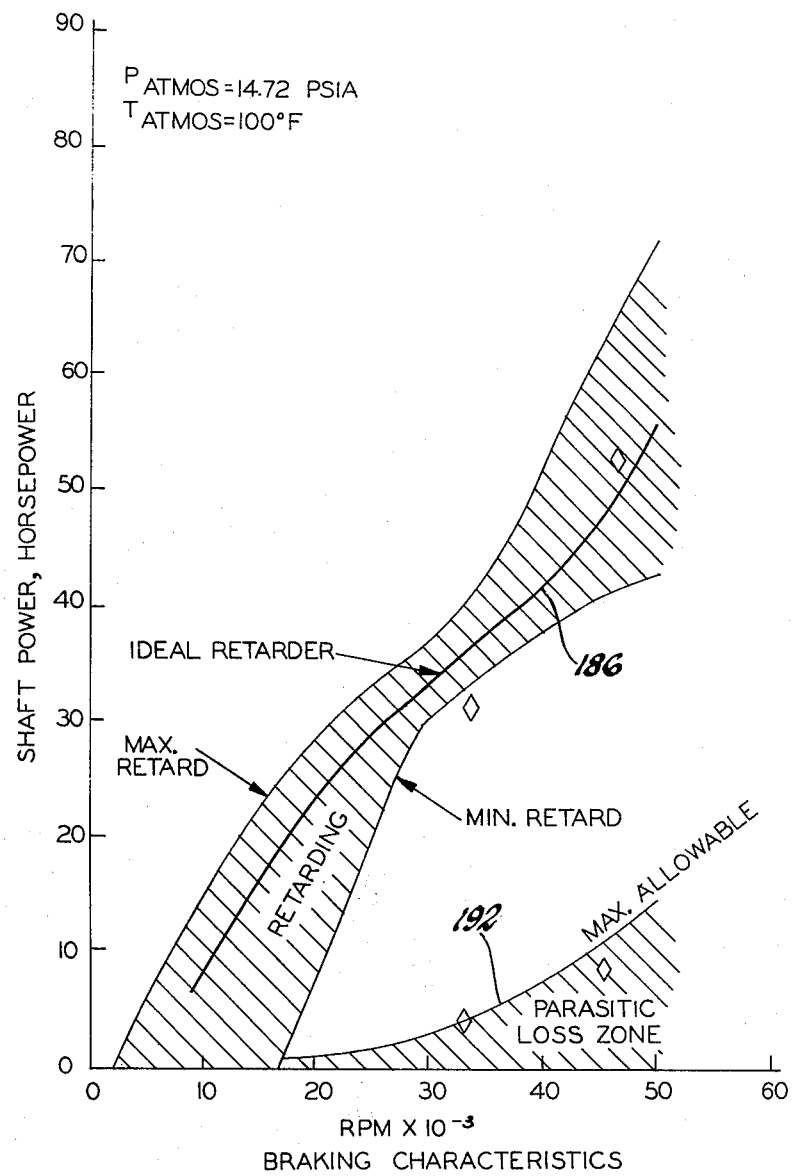
FIG. 5 is a chart showing the power exchange function of the air brake compressor in the assemblies of FIGS. 1–4 for different turbine operating speeds and under braking and normal operating conditions.

Power absorption during brake mode is shown by curve 186 in FIG. 5. This is produced when the vanes 156 are positioned radially inwardly (solid line position in FIG. 3).

When the crank 173 is moved to a throttle position, the ring 172 shifts each of the pins through an arcuate, adjustment path on the outer circumference of the ring 172 as best seen in FIG. 4 by curve 188 to cause each of the vanes to assume the dotted line position shown thereon at 190. This throttles inlet air flow into the inlet of the compressor wheel 120 and thereby reduces the amount of mass flow of air through the compressor and results in reduction in the power absorption by air brake assembly 118. The maximum throttling position and reduced power absorption is represented by the maximum allowable parasitic loss that is produced during gas turbine engine operation under normal vehicle cruise operation as shown by curve 192 in FIG. 5.

The invention is premised on controlling brake action of the compressor wheel 120 by regulating the amount of mass flow through the compressor. In the illustrated embodiment, inlet prewhirl and throttling are produced by the variable geometry controller 142 and the impeller wheel 120 coacts to produce power reduction which results in less horsepower absorption per pound of mass flow at reduced inlet air flow to the wheel 120.

By virtue of the above arrangement, the compressor impeller 120 is opened up for braking and is essentially closed off for minimum power absorption during vehicle cruise operation. The preferred centrifugal compressor produces a desirable power turndown ration, i.e., the ratio of braking power to parasitic cruise power, to avoid excessive fuel consumption penalty due to the air brake under vehicle cruise conditions. The ideal braking characteristics of curve 186 are specified to duplicate the braking characteristics of a 1973 Buick 455 cubic inch displacement engine. The shaft power of a typical air compressor brake varies approximately as the cube of the shaft speed. This compressor is configured to superimpose the power absorption therefrom to that of an existing reciprocating type internal combustion engine.

While the embodiments of the present invention, as herein disclosed, constitute a preferred form, it is to be understood that other forms might be adopted.

What is claimed is:

1. In a two-shaft gas turbine engine of the type including a first shaft having an engine compressor on one end thereof and a gasifier turbine on the opposite end thereof and a power turbine shaft having a power turbine on one end thereof and means coupled thereto for transferring power from the power turbine shaft to an output power shaft and wherein housing means are located radially outwardly of and circumferentially of said power turbine means, the improvement comprising: an air brake compressor including a centrifugal impeller connected to said power turbine shaft on the opposite end thereof from the power turbine thereon, a plurality of blades on said impeller each having an axial inlet and a radial outlet, inlet and discharge duct means for directing ambient pressure air into said air brake compressor and for directing pressurized air therefrom, means forming a cooling chamber arranged circumferentially around and radially outwardly of the housing means, means forming an outlet from said cooling chamber in communication with atmosphere for maintaining said cooling chamber at atmospheric pressure, said discharge duct means directing pressurized air from said air brake compressor into said cooling chamber for flow therethrough to atmosphere for cooling the engine turbine during operation thereof, said air brake compressor absorbing energy from the power turbine shaft and compressing ambient air for flow through said cooling chamber and subsequent discharge to atmosphere during engine operation, means including inlet guide vanes having a first control position to direct an elevated mass air flow through the compressor to produce an elevated power absorption by the air brake compressor during a first engine operating mode and to produce pressurized air flow through said cooling chamber during the first engine operating condition, said inlet guide vanes having a second position to throttle air flow into said compressor to produce a mass air flow therethrough less than said first mass air flow thereby to produce a minimum power absorption during a second engine operating condition and a continued flow of pressurized air through said atmospheric cooling chamber for cooling the engine during the second condition of operation thereof.

* * * * *